(12) United States Patent
Li et al.

(10) Patent No.: US 6,492,483 B1
(45) Date of Patent: Dec. 10, 2002

(54) INTEGRATED CONTINUOUS PROCESS FOR UPSTAGING EPOXY RESINS

(75) Inventors: Simon Ming-Kung Li; Harry Frank, both of Houston; Rupert R. Dominguez, Richmond, all of TX (US)

(73) Assignee: Resolution Performance Products LLC

( * ) Notice: Subject to any disclaimer, the term of this patent is extended or adjusted under 35 U.S.C. 154(b) by 0 days.

(21) Appl. No.: 09/469,209

(22) Filed: Dec. 21, 1999

(51) Int. Cl.[7] .......................... C08G 59/68; C08G 65/38
(52) U.S. Cl. ......................... 528/89; 422/134; 422/135; 523/427; 525/524; 528/103
(58) Field of Search ................... 528/89, 103; 523/427; 525/524; 422/134, 135

(56) References Cited

U.S. PATENT DOCUMENTS

| | | | | |
|---|---|---|---|---|
| 2,577,856 A | * | 12/1951 | Nelson | 422/135 |
| 2,880,076 A | * | 3/1959 | Kircher, Jr. et al. | 422/134 X |
| 3,477,990 A | * | 11/1969 | Dante et al. | 528/89 |
| 3,547,881 A | | 12/1970 | Mueller et al. | 528/89 |
| 3,629,217 A | * | 12/1971 | Balitrand et al. | 422/134 X |
| 3,919,169 A | | 11/1975 | Ramsey et al. | 528/89 X |
| 4,105,634 A | * | 8/1978 | Hanson et al. | 528/89 X |
| 4,320,222 A | * | 3/1982 | Lopez | 528/89 |
| 4,370,470 A | * | 1/1983 | Vidaurri et al. | 422/134 X |
| 4,442,273 A | * | 4/1984 | Neiditch et al. | 422/134 X |
| 4,525,497 A | * | 6/1985 | Kobayashi et al. | 528/89 X |
| 4,612,156 A | | 9/1986 | Heinemeyer et al. | 264/176 |
| 4,767,832 A | * | 8/1988 | Marx | 525/524 X |
| 4,880,892 A | * | 11/1989 | Urano et al. | 528/89 |
| 5,364,925 A | * | 11/1994 | Kohno et al. | 515/524 X |

* cited by examiner

*Primary Examiner*—Richard D. Lovering

(57) ABSTRACT

The present invention discloses a continuous process and the associated system for upstaging liquid epoxy resins to produce resins with higher molecular weight. The process comprises passing continuously (i) a liquid epoxy resin having a first molecular weight, (ii) a catalyst and (iii) a compound having at least one active hydrogen or reactive functional group capable of reacting with the liquid epoxy resin in the presence of the catalyst, flow through one or more reaction chambers and under conditions effective to produce a stream comprising an upstaged epoxy resin product having a second molecular weight. The second molecular weight is higher than the first molecular weight.

25 Claims, 1 Drawing Sheet

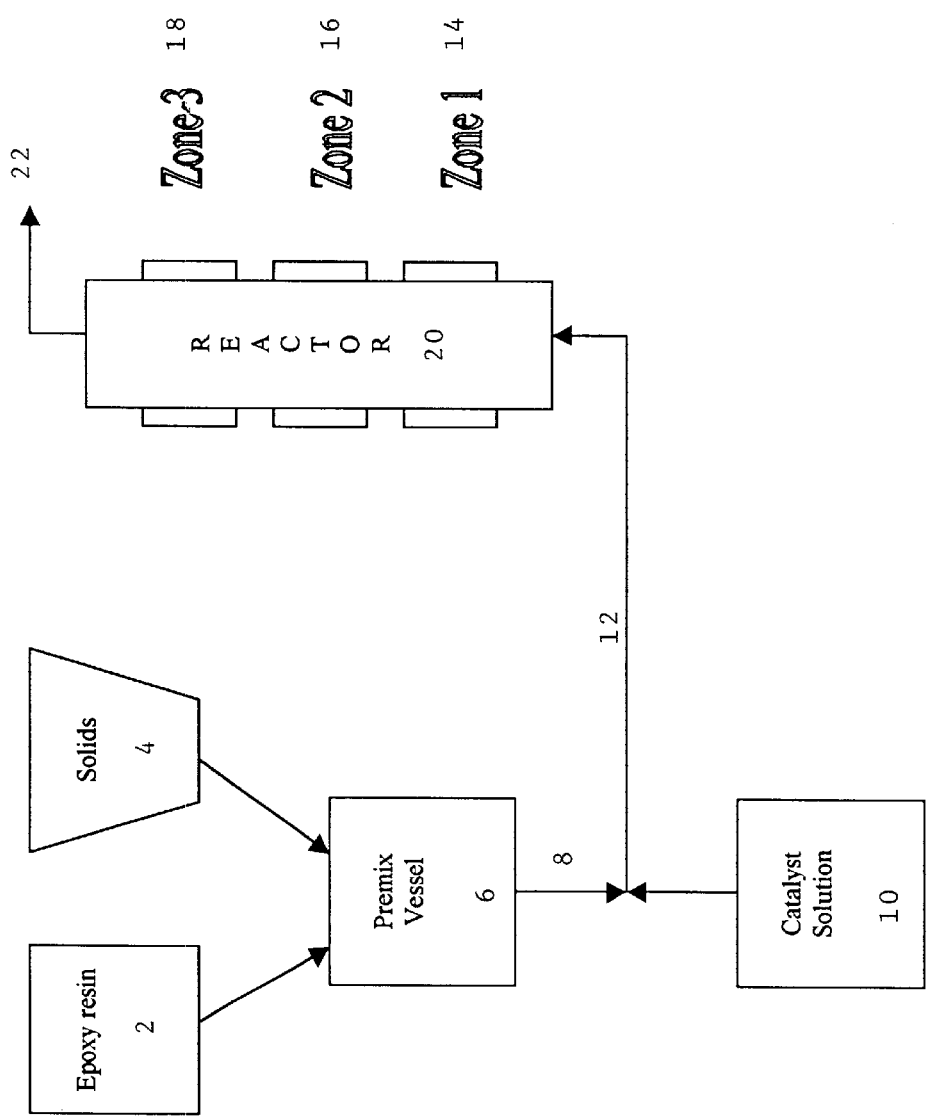
Figure 1. Schematic Diagram of the Integrated Continuous Reaction System

INTEGRATED CONTINUOUS PROCESS FOR UPSTAGING EPOXY RESINS

FIELD OF THE INVENTION

The present invention relates to an integrated continuous process and the associated system for upstaging lower molecular weight liquid epoxy resins in one or more reactor chambers with one or more reaction zones in each chamber to produce a stream comprising a higher molecular weight product of resinous polyepoxides, hydroxy-terminated polyethers or phenolic terminated polyethers.

BACKGROUND OF THE INVENTION

Epoxy resins have been known for many years. In combination with a suitable curing agent, such thermosetting resinous polyepoxides, have produced thermosetting polymers useful for many applications, providing a combination of superior toughness, flexibility, adhesion and electrical properties and chemical resistance in the finished products. The terms "polyepoxide," "resinous polyepoxide," "polyethers" and "epoxy resin" are used herein interchangeably.

The most common types of resinous polyepoxides are produced by reacting monomeric epoxy compounds, such as epichlorohydrin, with polyhydric (including dihydric) phenols, such as bisphenol-A (BPA), to give diglycidyl ethers. Depending primarily upon their molecular weights, resinous polyepoxides may vary from a viscous liquid to a high melting solid.

Higher molecular weight solid or semi-solid resinous polyepoxides, hydroxy- or phenolic-terminated polyethers are often made by a process known as "upstaging," "upgrading," "fusion" or "advancement". In such an upstaging or advancement process, a lower molecular weight liquid resinous polyepoxide is reacted with a polyhydric, most often dihydric, phenol in the presence of a catalyst until enough of the phenol is incorporated into the epoxy polymer chain, terminally and/or as a crosslinking agent, to increase the molecular weight of the upstaged epoxy resin product to the desired level. If the molecular weight is high enough, the product is in the solid form at room temperature. Other than using polyhydric phenols, it also is known that such an upstaging process may be carried out using carboxyl- or other hydroxyl-containing compounds or mixtures thereof.

The upstaging processes have in the past been carried out in both a batch process or a continuous process. See, for example, U.S. Pat. Nos. 3,547,881, 3,919,169 and 4,612,156. Typically in these known batch and continuous upstaging processes, the dihydric phenols and liquid polyepoxide are admixed or otherwise contacted with a catalyst at a relatively low temperature and then heated up to the reaction temperature and held at a desired reaction temperature and other conditions for a time sufficient to produce the resinous polyepoxide or hydroxy-terminated polyether of a higher molecular weight. Sometimes, the catalyst is added after the reactants have already been mixed and heated up to a higher temperature.

The cycle times are relatively long in typical batch upstaging processes. This cycle time includes charging of the raw materials, the upstaging reaction itself, discharging and solidification/packaging of the product. For example, a batch process involving bisphenol-A or tetrabromobisphenol A (TBBPA) and a liquid polyepoxide consisting essentially of the diglycidyl ether of bisphenol-A can take from about 8 to about 12 hours of cycle time to complete. It would be advantageous to shorten the cycle time needed in a batch process as well as the residence time in a continuous process to increase productivity and/or to reduce capital investment.

Furthermore, it is difficult to maintain the homogeneity of temperature in a large batch reaction vessel. Since the upstaging reaction is exothermic and the viscosity of the reaction mixture is usually quite high, there may be heat-transfer problems, localized hot spots and/or substantial temperature gradients inside the vessel. Unintended and adverse gelling, non-uniform upstaging, over- or under-crosslinking, localized side-reactions or byproduct formation also may take place as a result of non-uniform reaction conditions. All of these problems can lead to non-uniform inhomogeneous product compositions and/or product properties. For example, the product may exhibit broad molecular weight distributions, broad softening points or glass transition temperatures, inconsistent chemical compositions and others. In addition to such problems within a given batch, it is also not unusual to have significant batch-to-batch differences. These differences may cause additional problems in various applications due to varying molecular weight distributions and the associated changes in viscosity and other properties such as softening point or glass transition temperatures.

As mentioned earlier, certain continuous reaction systems have been proposed or disclosed to upstage epoxy resins using, for example, a long tubular (pipe) reactor (length/diameter=900) and a long tubular post-heat zone (l/d=1020) as disclosed in U.S. Pat. No. 3,919,169; or using a twin-screw extruder reactor as disclosed in U.S. Pat. No. 4,612,156. Long tubular or pipe reactors are generally known to subject to fouling problems due to heavies buildup and the upstaged products tend to show broad molecular weight distributions (so-called polydispersion or $M_w/M_n$, the ratio of weight averaged molecular weight and number averaged molecular weight). The extruder reactor is an expensive piece of equipment for commercial scale productions. While these two patents might have disclosed certain general concepts with respect to continuous upstaging of epoxy resins, they disclose neither the use of a solvent in the system, nor the advantages of using non-tubular/non-extruder type reactors and/or the importance of particular modes of flow or flow directions of feeds.

BRIEF DESCRIPTION OF THE DRAWING

FIG. 1 is a block diagram of a system configuration of the present invention as disclosed herein for upstaging liquid epoxy resins to produce higher molecular weight epoxy resins, hydroxy- or phenolic-terminated polyethers. An illustrative embodiment of a single three-zone reactor chamber is shown in the Figure. One skilled in the art would understand and appreciate that while FIG. 1 encompasses and conveys the essence of a specific embodiment of the present invention, many other equipment and the associated instrument typically required for laboratory or commercial units, such as internal stages inside the reactor, detailed configuration inside the mixing unit, valves, flow controls, metering devices, heat exchangers, pumps, waste disposals, purges and the like, are not shown.

OBJECTS OF THE INVENTION

One object of the present invention is to provide improvements in the production process of higher molecular weight epoxy resins, hydroxy- or phenolic- terminated polyethers from liquid epoxy resins from lower molecular weight, preferably liquid, epoxy resins.

Another object of the present invention is to provide a continuous process in one or more reaction chambers, such as upflow reaction chambers, for making higher molecular weight epoxy resins or hydroxy-terminated polyethers from lower molecular weight, preferably liquid, epoxy resins in the presence of a suitable catalyst. By using the present invention, there is generally less gel formation during the upstaging reaction and the upstaged epoxy resin product usually has more consistency in chemical and physical properties.

Another object of the present invention resides in an integrated continuous reaction system for upstaging epoxy resin, particularly liquid epoxy resins to produce an upstaged product having a higher molecular weight.

From the following summary of the invention and detailed description of the preferred embodiments, other additional and more particular objects and the associated advantages of the present invention will become more apparent to and better appreciated by one skilled in the art.

SUMMARY OF THE INVENTION

The present invention relates to a continuous process and a system for upstaging epoxy resins, particularly liquid epoxy resins. Both the process and the system may be used with-or without a solvent.

The process comprises passing continuously (i) a liquid epoxy resin having a first molecular weight, (ii) a catalyst and (iii) a compound having at least one active hydrogen or reactive functional group, such as polyhydric (including dihydric) phenols, which is capable of reacting with the liquid epoxy resin in the presence of the catalyst, flow through one or more reaction chambers' and under conditions effective to produce a stream comprising an upstaged epoxy resin product having a second molecular weight, wherein the second molecular weight is higher than the first molecular weight. In one embodiment of the present invention, the components (i) (ii) (iii) flow co-currently via an upflow mode in vertical reaction chambers.

This invention also relates to a system for upstaging epoxy resins comprising (a) a first source supplying a liquid epoxy resin having a first molecular weight; (b) a second source supplying a catalyst; (c) a third source supplying a compound having at least one active hydrogen or reactive functional group capable of reacting with the liquid epoxy resin in the presence of said catalyst; and (d) at least one vertical reactor operating in an upflow mode, in which a reaction mixture comprising the liquid epoxy resin, the compound and the catalyst reacts under conditions effective to produce a stream comprising an upstaged epoxy resin product having a second molecular weight, wherein the second molecular weight is higher than the first molecular weight.

DETAILED DESCRIPTION OF THE INVENTION

The present invention is directed to a process for continuous upstaging (or upgrading epoxy resins, particularly liquid and/or lower molecular weight epoxy resins. The reaction chamber(s) of the present invention can be in the upflow mode, down flow mode or horizontal mode, and the feed can flow co-currently or counter-currently. By using a co-current and continuous reaction system in an upflow mode inside the reaction chambers, one may use one or more simple and easy-to-maintain reactors with static-mixer(s), dynamic mixer(s) or combinations thereof to produce the upstaged epoxy resins. Since a wide range of residence time, the number of zones in each reaction chamber and other reaction conditions or unit configurations can be adjusted and designed into this type system, the amount of catalyst used does not have to be very high to achieve the same results.

When a solvent is used, an additional advantage of the present process resides in the fact that the solvent also serves as a sink for the heat released during the upstaging reaction. The resulting product solution can be further diluted to a desired concentration, or blended with other additives or components as necessary to give the final formulated product. In the case where solid products are required, the process may be run without a solvent. Alternately, any solvent used in the process or system may be removed by any suitable and well known post-reaction evaporations or distillations, followed by solidifying the product accordingly. For example, liquid EPON® Resin 828, BPA or TBBPA-based solutions and a catalyst solution may be conveniently used in a solvent-based process. The presence of a solvent allows easier material handling, particularly for solid materials like BPA (if it is pre-dissolved in the solvent), more accurate metering of solid reaction component(s) and avoidance of exposure or presence of solid dust to reduce the potential of explosion risks EPON is a registered trademark of Shell Oil Company.

In one embodiment of the present invention, a liquid epoxy resin feed and a compound having at least one active hydrogen, such as polyhydric, including dihydric, phenol, are separately charged co-currently to a continuous vertical reactor from the bottom entry in an upflow mode. In another embodiment, the active-hydrogen containing compound may be first mixed with, suspended in and/or dissolve in a solvent. It is also within the embodiment of the present invention to premix the liquid epoxy resin feed, the compound having active hydrogen and, optionally, a solvent. This premix along with a catalyst (solid, liquid or solution) are fed together or separately to the bottom of the vertical reaction chamber(s) so that the entire reaction mixture passes through the one or more reaction zones continuously, co-currently and, preferably, in an upflow mode.

If a premixing is desired, for instance a liquid epoxy resin is mixed with a dihydric phenol, it can be carried out in many ways and under many different conditions. One preferred example is to add the reactants separately to a continuously stirred tank reactor (hereinafter, CSTR) at a suitable temperature and preferably under an inert atmosphere and the mixture is continuously withdrawn from the CSTR to be sent to the reaction chamber or to be mixed with a catalyst, a solvent or other reactants. In a typical CSTR or other suitable premix vessel, there should be sufficient number of stages so that the residence time and other operating conditions in the CSTR may be controlled and/or adjusted to achieve the desired level of premixing.

When a premixing vessel is used, the temperature is in the range of from about 71° C. to about 160° C. (160° F. to about 320° F.), preferably from about 82° C. to about 138° C. (180° F. to about 280° F.), and preferably from about 93° C. to about 121° C. (200° F. to about 250° F.). A suitable residence time in the premix vessel is in the range of from about 10 minutes to about 6 hours, preferably from about 20 minutes to about 4 hours, and more preferably from about 30 minutes to about 2 hours. This residence time is defined as the ratio of the volume of the premix vessel to the combined feed rate, in volume, of liquid epoxy resin and the polydric phenol type compound. If a catalyst and/or a solvent is also added to the premix vessel, the volume(s) need be included in the calculations. It is also preferred to have a nitrogen or other inert gas purge or blanket to reduce exposure or contact of the reactants to air.

The reaction chamber, optionally, may be heat traced by setting heat-tracing outside the reactor or by heat exchanges or heating elements inside the reaction chamber or both. The controlling of temperature is achieved via lone or more local or remote controllers. The premix solution may be delivered, e.g. via a diaphragm pump, continuously through one or more reaction chambers and/or one or more sequentially staged reactor zones of each of the reaction chambers in which the upstaging reaction takes place.

The present process may use one or more reaction chambers, with one or more reaction zones, preferably sequentially staged, in each of the reaction chambers. Examples of suitable reaction chambers or reactors include, but are not limited to a pipe or tubular reactor, a plurality of two or more staged pipe reactors with mechanical mixing means, mechanisms, designs or devices, and combinations thereof. Examples of suitable mixing mechanisms, devices or designs include, but are not limited to, static mixing element (or mixer), dynamic mixer and combinations thereof so that all of the reactants can form a substantially uniform mixture. Commercially available reactors such as LIST reactors, Buss reactors and/or screw reactors may be used for the present invention.

Cylindrical reactors are most common and preferred, but other reactor shapes or configurations may be used as well. Different reaction chambers or zones may have different fixed or variable diameters to control residence time and/or weight, volume or linear space velocity. It is further possible and within the embodiment of the present invention to inject solvent, reactants, catalyst or mixtures thereof at different locations in each reaction chamber and/or reaction zones.

In general, a suitable reaction chamber should have sufficient number of stages to achieve the desired degree of upstaging of the liquid epoxy resin in the feed. Typically, 4 stages to about 100 stages should be adequate, preferably from about 6 stages to about 60 stages, more preferably 10–40 stages.

Many reaction parameters in each reaction chamber or each zone within a particular reaction chamber may be monitored, controlled and/or adjusted individually. These parameters include but are not limited to temperature, residence time, volume or weight or linear space velocity and others or combinations.

The following are temperature ranges for one embodiment as shown in FIG. 1 when there is one reaction chamber consisting of 10 internal mixing stages with three sequentially reaction zones. It generally preferred to have a lowest temperature at the bottom zone where the reactants enter the reaction chamber, and use progressively higher temperatures in the upper zones in the reaction chamber as the reactants pass through the chamber in an upflow mode. Accordingly, it is preferred to have the following relationship in a three-zoned reaction chamber: Temperature $_{zone\ 1}$<Temperature $_{zone\ 2}$<Temperature $_{zone\ 3}$. For the reactions disclosed in Examples 1–6, the temperatures are:

Zone 1: from about 93° C. to about 171° C. (about 200° F. to about 340° F.); preferably from about 93° C. to about 160° C. (about 200° F. to about 320° F.); and more preferably from about 105° C. to about 149° C. (about 220° F. to about 300° F.).

Zone 2: from about 105° C. to about 205° C. (about 220° F. to about 400° F.); preferably from about 116° C. to about 193° C. (about 240° F. to about 380° F.); and more preferably from about 127° C. to about 182° C. (about 260° F. to about 360° F.).

Zone 3: from about 127° C. to about 216° C. (about 260° F. to about 420° F.); preferably from about 138° C. to about 205° C. (about 280° F. to about 400° F.); and more preferably from about 160° C. to about 205° C. (about 320° F. to about 400° F.). This relationship of progressively higher temperature for latter stages or zones of the reaction can be generalized to reaction chambers with two or four and more reaction zones.

A continuous process is most preferred for the present invention. However, there may be intermittent stoppage or planned shutdowns in order to clean the reactor, to purge undesired materials out of the system, to conduct maintenance and repairs or for other purposes known to one skilled in the art. It also may be possible to combine a continuous process with a batch or semi-continuous steps.

The reaction chamber(s) of the present invention can be in the upflow mode, down flow mode or horizontal mode. As a preferred embodiment of the present invention, the reaction mixture passes through the reaction chamber(s) and zones in an A upflow mode. In other words, the reaction chamber is vertical. The term "vertical" as used herein means that the reaction may be perpendicular to the ground or positioned at an angle to the ground such that the point where the feed enters, the feed point, is lower than the point, in terms of altitude, where the stream comprising product exists the reactor, the exiting point. In such a vertical reaction chamber, it is also possible to have the feed point higher the exiting point resulting in a downflow mode. However, it is more preferred for the present invention that the desired upstaging reaction in the reaction chamber is in an upflow mode, i.e. the feed enters from the bottom of the reaction chamber and exists from the top of the reaction chamber. In this most preferred embodiment, the feed point is not higher than or at the same level as the exiting point. When there are two or more reaction chambers, the flow in at least one reaction chamber must be upflow. It is more preferred that the upflow mode is used in all of the reaction chambers.

It is also preferred that all of the different components of the feed, including the solvent, if used, flow co-currently regardless whether they are premixed or mixed at some point in the process. It is also within the scope of the present invention that one or more components may flow counter-current relative to the others.

The duration of the upstaging reaction in a reaction chamber, i.e. the amount of time the reactants/feedstock stay in the reaction chamber(s) before it is discharged as the product stream, is typically from about 10 minutes to about 240 minutes, preferably from about 20 minutes to about 180 minutes, and more preferably from about 30 minutes to about 120 minutes. This duration is also referred to herein as residence time. It is the volume ratio of the reaction chamber to the combined feed rate or total throughput, including the liquid epoxy resin, the active hydrogen containing compound, the catalyst or catalyst solution, the solvent (if used), or any other materials present.

A number of solvents may be used for the present invention. It is preferred that they are inert during the reaction and provide sufficient solvency for at least one component of the reaction mixture, typically the catalyst, the compound with at least is one active hydrogen, or both. Examples include, but not limited to oxygenated compounds such as acetone, methyl ethyl ketone, diethylether, tetrahydrofuran, 2-methyltetrahydrofuran, dimethoxyethane, aromatics such as benzene, toluene, xylene(s), ethylbenzene, pseudocumene and cumene, sulpholane, $C_5$–$C_{10}$ aliphatic hydrocarbons including all the branched isomers, and mixtures thereof. The reaction mixture may contain from 0 to about 80 percent by weight of the solvent(s), based on the total weight of the reaction mixture.

The equivalency ratio of liquid epoxy resin to the compound having active hydrogen(s) or reactive function groups capable of reacting with a liquid epoxy resin is from about 3.3:1 to about 0.5:1, most preferably from about 1.6:1 to about 0.65:1. As a specific embodiment of the present invention, the equivalent ratio of liquid epoxy resin to the compound having one or more active hydrogens or one or more reactive function groups capable of reacting with a liquid epoxy resin is from about 3.3:1 to about 1.3:1, more preferably from about 2.7:1 to about 2.5:1 to produce the product epoxy or phenolic-terminated resin products with advanced (higher) molecular weight For the present invention, illustrative examples of suitable epoxy resins, particularly liquid epoxy resins, having an average of more than one vicinal epoxy group per molecule include those represented by the formulas I and II:

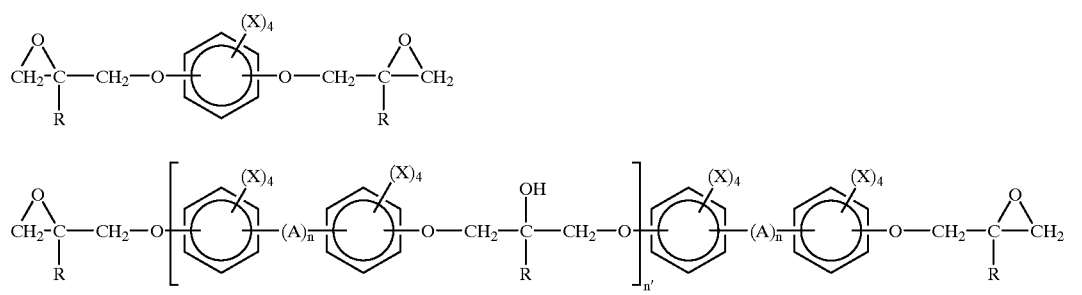

wherein each A is independently a divalent hydrocarbyl group having from 1 to about 10, preferably from 1 to about 6 carbon atoms, more preferably $R^1$—C—$R^2$ groups, wherein $R^1$ and $R^2$ are independently selected from methyl, ethyl or hydrogen; or A can be selected from:

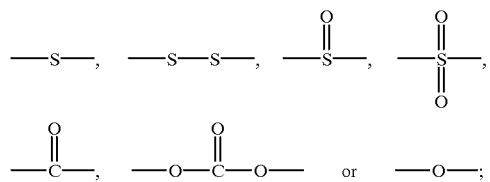

each R is independently hydrogen or a hydrocarbyl group having from about 1 to about 4 carbon atoms;

each X is independently hydrogen, a halogen, preferably chlorine or bromine, or a hydrocarbyl or hydrocarbyloxy group having from 1 to about 12 carbon atoms; n has a value of zero or 1; and n' has an average value of from about zero to about 2, preferably from about zero to about 0.3.

The term hydrocarbyl group means any aliphatic, cycloaliphatic or aromatic hydrocarbon group, which consists of hydrogen and carbon atoms. Likewise, the term hydrocarbyloxy group means those compounds represented by the formula —OR wherein R is a hydrocarbyl group as above defined.

Particularly suitable epoxy-containing materials include the glycidyl ethers of polyhydric phenols such as resorcinol, catechol, t-butylcatechol, hydroquinone, bisphenol A (BPA), bisphenol E, bisphenol F, tris(hydroxyphenyl) methane, 2,6,2',6'-tetrabromo-p,p'-bisphenol A, 2,6,2',6'-tetramethyl-3,5,3'-tribromo-p,p'-biphenol, 2,6,2',6'-tetramethyl-3,5,3',5'-tetrabromo-p,p'-biphenol, tetramethylbiphenol and mixtures thereof.

As one embodiment of the present invention, more preferred liquid resinous polyepoxides generally possess an n value averaging less than 1, i.e., a liquid resinous polyepoxide consisting essentially of the diglycidyl ether of bisphenol-A. Such a polyepoxide may have a weight per epoxide equivalent (WPE) value between about 180 and about 240. The term "liquid" means that the initial polyepoxide is in the liquid state at ambient conditions, i.e., 25° C. and 760 mmHg (101 kPa).

As indicated above, these polyepoxides are characterized by weight per epoxide equivalent values. Weight per epoxide equivalent or "WPE" is defined and used herein to indicate the grams of resinous polyepoxide containing one gram equivalent of epoxy groups. Weight per epoxide equivalent is determined by the procedures described in "Epoxy Resins", pp. 133–135, Burge, Jr. and Geyer, Analytical Chemistry of Polymers, Part I, Kline, Ed. (Interscience 1959), the description of which is herein incorporated by reference.

The other reactant materials to make the resins of the present invention are preferably polyhydric phenolic materials which include, as non-limiting illustrative examples resorcinol, catechol, t-butylcatechol, hydroquinone, bisphenol A, bisphenol E, bisphenol F, dihydroxybiphenyl, tris-hydroxyphenyl methane, 2,6,2',6'-tetrabromo-p,p'-bisphenol A, 2,6,2',6'-tetramethyl-3,5,3'-tribromo-p,p'-biphenol, 2,6,2', 6'-tetramethyl-3,5,3',5'-tetrabromo-p,p'-biphenol, tetramethyl biphenol, mixtures thereof and the like.

The relative amounts of a dihydric phenol and the resinous polyepoxide used as part of the feed in the process may vary over a wide range, depending upon the type of reactants and the type of product to be desired. For example, the polyepoxide and the dihydric phenol reactants may be used in equivalency ratios of epoxide groups to phenolic (Ar—OH) of from about 3.3:1 to about 0.5:1, preferably from about 2.6:1 to about 0.6:1, and more preferably from about 1.6:1 to about 0.65:1. The product, a hydroxy- or phenolic-terminated resin, has a molecular weight higher than that of the resinous polyepoxide feed.

Although polyhydric (including dihydric) phenolic compounds are preferred active hydrogen containing compounds, other compounds having active hydrogens or other reactive functional groups, including isocyanate, thiocyanate, N—H and S—H, also may be used for the instant invention. Such other compounds include, but are not limited to, materials that (a) contain an average of more than one organic hydroxyl, thiol, carboxyl, isocyanate, thioisocyanate, secondary amine group or combinations of such groups in the same molecule; and (b) contain only one primary amine group per molecule. All of these materials can be aliphatic, cycloaliphatic, aromatic or mixtures thereof.

Examples of suitable carboxyl (—COOH) containing compounds include, but are not limited to, dicarboxylic acids such as malonic acid, succinic acid, adipic acid, maleic acid, fumaric acid, terephthalic acid, isophthalic acid, dinicotinic acid, mixtures thereof and the like. Examples of suitable thiol (—SH) containing compounds include, but are not limited to, the thiol analogues to the aforementioned hydroxyl-containing (hydridic) materials. Preferred thiol-containing compounds include, but are not limited to, 1,4-dimercaptobenzene, 1,3-dimercaptobenzene, 1,2-dimercaptobenzene, ethylene mercaptan, 1,3-propanedithiol, 1,4-butanedithiol and mixtures thereof.

Examples of suitable isocyanate (—NCO) containing compounds include, but are not limited to, isocyanate-containing aromatics or aliphatics or cycloaliphatics or mixtures thereof. Preferred examples include, but are not limited to, hexamethylene-1,6-diisocyanate, benzene-1,4-diisocyanate, toluene diisocyanate, methylenediphenylisocyanate and mixtures thereof.

Examples of suitable thiocyanate (—SCN) containing compounds include, but are not limited to, the thiol analogues of the aforementioned isocyanate-containing compounds. Preferred examples include, but are not limited to, hexamethylene-1,6-dithiocyanate, benzene-1,4-dithiocyanate, toluenedithiocyanate, methylene-diphenylthiocyanate and mixtures thereof.

Examples of suitable secondary amine compounds include, but are not limited to any aromatic or aliphatic or cycloaliphatic secondary amine-containing materials. Preferred examples include, but are not limited to, piperazine, ethoxylated ethylenediamine and mixtures thereof.

Examples of suitable materials that contain only one primary amine group per molecule include, but are not limited to, aniline, halogenated and alkylated aniline, hexylamine, heptylamine, $C_8$ to $C_{35}$ aliphatic amine, cyclohexylamine, cycloheptylamine and alkylated cyclic amines and mixtures thereof. The alkyl groups may be linear or branched. Linear ones are preferred.

Similar to the polyhydric or dihydric phenols, the amounts of other compounds containing groups reactive toward epoxide (oxiran) functionalities and initial resinous polyepoxide to be employed in the process may vary over a wide range depending upon the type of reactants and the type of products. For example, the compound having reactive functional groups and the polyepoxide reactants may be used in equivalency ratios of epoxy groups to reactive functional group of from about 3.3:1 to 0.5.1, more typically from about 2.6:1 to 0.6:1, and most preferably from about 1.6:1 to 0.65:1.

Catalysts are usually needed to facilitate the upstaging reaction. Examples of preferred upstaging catalysts include, but are not limited to, the tetra organic substituted phosphonium salts, particularly the halides, and mixtures thereof. These phosphonium salts or halides are represented by the following formula:

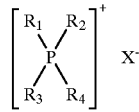

wherein X is a halogen, OH, formate, acetate and mixtures thereof, $R_1$, $R_2$, $R_3$ and $R_4$ are the same or different and represent hydrocarbon moieties, which may or may not be further substituted by one or more functional groups, such as halogens. These phosphonium halides may generally be prepared by mixing in approximately equimolar proportions of a phosphine with an appropriate organic halide. The mixing may be carried out with or without the application of heat, alone or in the presence of an inert solvent such as, for example, diethylether, benzene, chloroform or carbon tetrachloride. The hydroxide and carboxylate salts are more conveniently prepared from a phosphonium halide by an ion exchange reaction.

Examples of preferred phosphines include, but are not limited to, the organic phosphines, i.e., compounds of the formula $$P(R)_3$$

The R's may be the same or different in the same molecule and at least one R is an organic radical and the other R's are hydrogen or organic radicals and preferably hydrocarbon radicals or substituted hydrocarbon radicals which may contain no more than 35 carbon atoms. Illustrative examples of suitable phosphines include, but are not limited to, triphenyl phosphine, tributyl phosphine, trilauryl phosphine, tricyclohexyl phosphine, trihexyl phosphine, triallyl phosphine, tridodecyl phosphine, trieicosadecyl phosphine, tri(chlorobutyl) phosphine, tri(ethoxybutyl) phosphine, trihexenyl phosphine, trixylyl phosphine, trinaphthyl phosphine, tricyclohexenyl phosphine, tri(3,4-diethyloctyl) phosphine, trioctadecyl phosphine, dioctyidecyl phosphine, dicyclohexyl phosphine, dibutyl allyl phosphine and the like, and mixtures thereof.

Examples of more preferred phosphines include, but are not limited to, the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl cycloalkyl, alkenyl, cycloalkenyl, aryl, alkaryl, arylalkyl, and the like radicals. Coming under special consideration are the phosphines containing one, two and most preferably three aromatic radicals.

It is also within the embodiment of the present invention that the phosphines themselves could also be used without further modification as catalysts. Examples of such phosphines include, but are not limited to, triphenylphosphine, tris(p-tolyl)phosphine, tris(p-chlorophenyl)phosphine, tri(n-butyl)phosphine, dibutylallylphosphine, trilaurylphosphine, trihexenylphosphine, tridodecylphosphine, dicyclohexylphosphine, trinaphthyl-phosphine, tri(ethoxybutyl)phosphine, tris-(p-methoxyphenyl)phosphine, tris(p-fluorophenyl)phosphine, and mixtures thereof.

Compounds to be mixed with the phosphine in the preparation of the phosphonium halide catalyst include, but are not limited to, organic halides. Preferred organic halides are those wherein the organic radical is a hydrocarbon radical, preferably having from 1 to 10 carbon atoms. Illustrative non-limiting examples of preferred organic halides include methyl chloride, ethyl chloride, methyl bromide; ethyl bromide, methyl iodide, ethyl iodide, propyl iodide, n-butyl iodide, sec-butyl iodide and n-decyl iodide, and the like, and mixtures thereof. After forming the phosphonium halide compound, the halide ion can be further exchanged with other anions, such as carboxylate, hydroxide and mixtures thereof. Examples of a suitable carboxylate include, but are not limited to formate, acetate, propionate and the like. Certain adducts may be used as well. One example of such an adduct is ethyl triphenylphosphonium acetate-acetic acid adduct.

More specific examples of the above-noted phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyl tributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide, and the like, as well as mixtures thereof.

In addition to phosphines and phsophonium compounds, organoammonium compounds also can be used as catalysts. Examples include, but are not limited to, tetrhydrocarbylammonium halides, hydroxide or carboxylates, trihydrocarbylammonium halides, hydroxide or carboxylates, and mixtures thereof. The hydrocarbyl moieties are the same as those disclosed for the corresponding phosphonium compounds, including alkyl, cycloaliphatic (cycloalkyl), aryl (aromatic) groups and mixtures thereof. More specific non-limiting examples include, but are not limited to tetramethylammonium chloride, tetramethylammonium bromide, tetramethylammonium iodide, tetramethylammonium hydroxide, tetraethylammonium chloride, tetraethylammonium bromide, tetraethylammonium iodide, tetraethylammonium hydroxide, and mixtures thereof. Tetramethylammonium chloride is a more preferred ammonium salt catalyst.

The amount of the upstaging catalyst used for the upstaging reaction and fed into the reaction chamber may vary over a wide range of concentrations. In general, the amount of the catalyst is in the range of from about $5\times10^{-5}$: 1 to about $2\times10^{-3}$: 1, preferably from about $1\times10^{-4}$: 1 to about $1\times10^{-3}$: 1, and most preferably from about $1.5\times10^{-4}$: 1 to about $5\times10^{-4}$: 1, based on the ratio of the equivalent of the catalyst to the equivalent of the epoxy resin employed in the reaction mixture (referred to as eq/eq).

In addition to the amount of catalyst used, the reaction conditions at each reaction zone are maintained for a period of time sufficient to produce a thermosetting polyepoxide, phenoxy-terminated resin, or hydroxy-terminated polyether upstaged or advanced to the desired molecular weight or weight per epoxide equivalent.

For example, when the stream comprises a higher molecular weight product that has the structural formula II as shown above, wherein X is hydrogen and n is 0, the average value of n' may be allowed to increase by at least about 2, and preferably by about 4 to 12, from its initial value.

As an illustrative embodiment of the present invention, the molecular weight of the feed epoxy resin is from about 340 to about 800 preferably from about 360 to about 450, and most preferably from about 370 to about 420. The upstaged product epoxy resin has an average molecular weight from about 600 to about 10000, preferably from about 800 to about 6000 and most preferably from about 900 to about 5000.

ILLUSTRATIVE EMBODIMENTS

The following examples are intended for better understanding of the invention and for illustration purposes only. They should not be construed as limiting the scope or spirit of the invention, which is defined by the entire written description and the claims below. All parts, percentage and proportions referred to herein and in the appended claims are by weight unless otherwise indicated.

The liquid EPON® Resin 828 used in all of the examples has a typical epoxy content of 185–192 g/eq epoxy and it is available commercially from Shell Oil Company.

EXAMPLES SHOWING CONTINUOUS PROCESSES

Description of the Integrated Continuous Reaction System

A schematic diagram of the Integrated Continuous Reaction System is shown in FIG. 1. A lower molecular weight liquid epoxy resin from first source 2 and a compound, such as a polyhydric phenol, from second source 4 are fed co-currently into mixing unit 6. A pump and/or other mechanism may be used to effect the feeding. It is also optional to purge the sources and the rest of the system with nitrogen or other gases inert to the system to avoid exposure to or contact with air, unintended decompositions or other changes of the materials.

The pre-mixed or admixed blend 8 is then fed co-currently with catalyst from source 10 to form a reaction mixture 12, which is sent to reaction chamber 20. The reaction mixture 12 can be sent to the bottom of the reaction chamber if an upflow reaction chamber is used. There could be in-line static, dynamic or combinations mixing mechanisms, means or designs to allow the formation of 12, a substantially uniform reaction mixture. Reaction chamber 20, having e.g., 10 internal mixing stages, preferably cylindrical, as shown here has three sequential reaction temperature zones, 14, 16 and 18. Each of the reaction temperatures zones cover roughly a little over 3 internally mixed stages inside the reaction chamber. These zones may be independently controlled to have different temperatures (heat input or cooling) and/or residence time and/or space velocity and/or other reaction parameters in order to produce a product with the desired properties. Preferred reactor chamber 20 may be selected from those typically used for handling high-viscosity materials or fluids. Examples of 20 include LIST reactors, Buss reactors and screw reactors.

Reaction mixture 12 passes through reaction chamber 20 (and all the zones) in an upflow mode to form product 22. Product 22 comprises a higher molecular weight upstaged epoxy resin, which may be polyethers, hydroxy- or phenolic-terminated epoxy resins. The molecular weight of the upstaged epoxy resin in 22 is higher than that of liquid epoxy resin feed 2.

Optionally, there may be other units (not shown in FIG. 1) to further process product 22. Such units may effect catalyst removal/separation, solvent (if any present or necessary to remove) removal/separation/recovery, product purification, blending other materials, diluent(s) and/or solvents into the product to make a formulated product. For example, additional blending units (not shown) in which other materials may be added to the upstaged product to produce a formulated upstaged epoxy resin product.

General Experimental Procedure

A liquid epoxy resin (LER) was discharged from a storage tank such as a heated jacketed 55-gallon drum via a pre-calibrated pump. The LER feed passed through one or more heat exchangers to be further heated to a temperature at about 115–127° C. (240–260° F.) and then entered a premix vessel. It is preferred to use nitrogen purges atmosphere, where appropriate, to avoid or minimize exposure to or contact with air.

The polyhydric phenol, if in solid form, such as BPA, was charged from a bag into a K-Tron hopper. Measured amount of BPA solids from the K-Tron was screw-conveyed through a funnel into the premix vessel. An air-vibrator may be used to minimize bridging of solids. If the phenol used is in a liquid, solution, or suspension form, it can be added or metered into the premixing vessel (also referred to as pre-mixer) by using a suitable pump.

A vessel, such as a multi-stage CSTR (continuous stirred-tank reactor) was used as the pre-mixer. It is preferred to be equipped with an agitator to provide sufficient mixing. The temperature, the residence time, other operating parameters and reaction conditions of the staged pre-mixer unit were controlled to allow total dissolution of the solids, if any is used, and/or uniform mixing of the various liquid components. The mixture ("premix") was then pumped out from the bottom of the pre-mixer to enter the bottom of a continuous vertical reaction chamber such that the mixture passed through the reaction chamber, including any sequentially staged reaction zones, in an upflow mode. A LIST reactor was used for Examples 1–6.

A catalyst or catalyst solution was metered or pumped in-line co-currently with the premix. An in-line static mixer was provided in the following examples to ensure sufficiently homogeneous and/or uniform mixing of the premix with the catalyst or catalyst solution before the mixture enters the vertical LIST reactor via bottom entry in an upflow mode. The catalyst used for Examples 1–6 below was a 25 wt % ethyl triphenylphosphonium iodide in ethanol solution. The phosphonium salt and most of other catalysts are available from Aldrich Chemical Company and many other chemical vendors.

The LIST reactor used in the experiments had a nominal 16 liters of volume and a 10-stage design with double mechanical seal. There were three sequentially staged reaction zones in the particular reactor used for the disclosed examples. Temperatures of these zones were separately monitored and controlled. After a suitable residence time in the List reactor, the product passed through heat traced lines and was discharged into a receiving container for sampling, collection and optionally, further processing, purification, blending and/or formulating.

In a typical operation, the feed rates were gradually increased to the targeted flow rates and the temperatures of the reaction zones were adjusted as needed due to the exothermic nature of the upstaging reaction. The flow rates were monitored during the reaction, and product samples were taken and analyzed at certain time intervals. The results were used to adjust the reaction conditions.

Example 1

The LER and BPA charge rates into the premix vessel were respectively set at 6 Kg and 3.1 Kg/hr (13.2 and 6.8 lb/hr), and the vessel temperature was maintained at 105–115° C. (220–240° F.). The homogeneous mixture was pumped from the premix vessel along with the catalyst solution (@ 18.2 g/hr) into the bottom entry point of the LIST reactor. The agitator inside the LIST reactor was set at 22 rpm.

Regulated steam sources were respectively supplied to the three reaction zone jackets, and the temperature readings near the outlets of the zones were: 148° C. (299° F.), 163° C. (325° F.) and 181° C. (357° F.). The pressure reading at the exit was 1.18 MPa (157 psig).

Samples taken at exit at steady state gave 1963 WPE. GPC molecular weights are given in Table 1.

Example 2

The LER and BPA charge rates into the premix vessel were set respectively at 10.4 and 5.4 Kg/hr (23.0 and 12.0 lb/hr), and the vessel temperature was maintained at 105–115° C. (220–240° F.). The homogeneous mixture was pumped from the premix vessel along with the catalyst solution (@ 31.8 g/hr) into the bottom entry point of the LIST reactor. The reactor agitator was set at 22 rpm.

Regulated steam sources were respectively supplied to the three reaction zone jackets, and the temperature readings near the outlets of the zones were: 144° C. (292° F.), 172° C. (341° F.) and 194° C. (382° F.). The pressure reading at the exit was 536 kPa (63 psig).

Samples taken at exit at steady state gave 2057 WPE. GPC molecular weights are given in Table 1.

Example 3

The LER and BPA charge rates into the premix vessel were respectively. set at 6.4 and 2.7 Kg/hr (14.0 and 6.0 lb/hr), and the vessel temperature is maintained at 110–118° C. (230–245° F). The homogeneous mixture is pumped from the premix vessel along with the catalyst solution (@ 18.2 g/hr) into the bottom entry point of the LIST reactor. The agitator inside the LIST reactor was set at 50 rpm.

Regulated steam sources were respectively supplied to the three reaction zone jackets, and the temperature readings near the outlets of the zones were: 126° C. (258° F.), 149° C. (301° F.) and 176° C. (349° F.). The pressure reading at the exit was 148 kPa (6.7 psig).

Samples taken at exit at steady state gave 947 WPE. GPC molecular weights are given in Table 1.

Example 4

The LER and BPA charge rate into the premix vessel were respectively set at 6.9 and 2.2 Kg/hr (15.2 and 4.8 lb/hr), and the vessel temperature was maintained at 113–118° C. (235–245° F.). The homogeneous mixture was pumped from the premix vessel along with the catalyst solution (@ 18.2 g/hr) into the bottom entry point of the LIST reactor. The agitator inside the LIST reactor was set at 22 rpm.

Regulated steam sources were respectively supplied to the three reaction zone jackets, and the temperature readings near the outlets of the zones were: 126° C. (258° F.), 141° C. (285° F.) and 170° C. (338° F.). The pressure reading at the exit was 116 kPa (2.1 psig).

Samples taken at exit at steady state gave 526 WPE. GPC molecular weights are given in Table 1.

Example 5

The LER and BPA charge rate into the premix vessel were respectively set at 6.9 and 2.2 Kg/hr (15.1 and 4.9 lb/hr), and the vessel temperature was maintained at 105–110° C. (220–230F.). The homogeneous mixture was pumped from the premix vessel along with the catalyst solution (@ 18.2 g/hr) into the bottom entry point of the LIST reactor. The agitator inside the LIST reactor was set at 22 rpm.

Regulated steam sources were respectively supplied to the three reaction zone jackets, and the temperature readings near the outlets of the zones were: 128° C. (262° F.), 145° C. (293° F.) and 176° C. (349° F.). The pressure reading at the exit was 116 kPa (2.1 psig).

Samples taken at exit at steady state gave 530 WPE. GPC molecular weights are given in Table 1.

Example 6

The LER and BPA charge rate into the premix vessel were respectively set at 15.4 and 5.0 Kg/hr (34.0 and 11.0 lb/hr), and the vessel temperature was maintained at 105–110° C. (220–230° F.). The homogeneous mixture was pumped from the premix vessel along with the catalyst solution (@ 41 g/hr) into the bottom entry point of the LIST reactor. The reactor agitator was set at 65 rpm.

Regulated steam sources were respectively supplied to the three reaction zone jackets, and the temperature readings near the outlets of the zones were: 128° C. (262° F.), 145° C. (293° F.) and 176° C. (349° F.). The pressure reading at the exit was 115 kPa (2 psig).

Samples taken at exit at steady state gives 530 WPE. GPC molecular weights are given in Table 1.

The experimental conditions and properties of the product obtained from the above examples are summarized in Table 1.

The products produced have excellent product consistency.

TABLE 1*

| Example | WPE | Molecular Weight# | | | Reactor Temperature ° C. | | | Outlet Pressure | Total Rate |
| | | Mw | Mn | Q | Zone 1 | Zone 2 | Zone 3 | psig | lb/hr |
| --- | --- | --- | --- | --- | --- | --- | --- | --- | --- |
| 1 | 1963 | 18600 | 3720 | 5.00 | 148 | 163 | 181 | 157 | 20 |
| 2 | 2057 | 15700 | 3800 | 4.14 | 144 | 172 | 194 | 63 | 35 |
| 3 | 947 | 7070 | 2180 | 3.24 | 126 | 149 | 176 | 6.7 | 20 |
| 4 | 526 | 3060 | 1180 | 2.58 | 126 | 141 | 170 | 2.1 | 20 |
| 5 | 530 | 3110 | 1180 | 2.61 | 128 | 145 | 176 | 2.1 | 20 |
| 6 | 543 | 3390 | 1120 | 3.01 | 128 | 145 | 176 | 2.0 | 45 |

*The corresponding pressures and rates in SI units can be found in the individual examples.
The molecular weights were determined by Gel Permeation Chromatography (GPC) equipped with UV detectors.

From the foregoing description, one skilled in the art can appreciate the advantages and other essential characteristics of this invention. A further understanding of the nature and advantage of this invention herein may be realized by referencing to the remaining portions of the specification and the appended claims. Also it is to be understood that the forms of the invention herein are to be taken as preferred examples of the same and that various changes or variations may be made without departing from the spirit of the invention or the scope of the claims.

What is claimed:

1. A continuous process for upstaging epoxy resins, the process comprising: passing continuously
   (i) a liquid epoxy resin having a first molecular weight,
   (ii) a catalyst, and
   (iii) a compound having at least one active hydrogen or reactive functional group capable of reacting with said liquid epoxy resin in the presence of said catalyst;
   upflow through one or more vertical reaction chambers under conditions effective to produce a stream comprising an upstaged epoxy resin product having a second molecular weight,
   wherein said second molecular weight is higher than said first molecular weight, and said one or more vertical reaction chambers comprises a vertical reaction chamber having more than one successive reaction zone, wherein a bottom zone where the reactants (i), (ii), and (iii) enter has a temperature which is less than the temperature in an upper zone above the bottom zone as the reactants pass through the zones in an upflow mode.

2. The process of claim 1, wherein said liquid epoxy resin and said compound are premixed in a mixing unit prior to addition of said catalyst and said feed components (i) (ii) and (iii) flow co-currently through the reaction chambers.

3. The process of claim 2, wherein said one or more reaction chambers comprise a plurality of reaction zones.

4. The process of claim 1, which process further comprises passing a solvent co-currently with (i), (ii) and (iii) upflow through said one or more vertical reaction chambers.

5. The process of claim 1, wherein equivalency ratio of said liquid epoxy resin to said compound is in the range of from about 3.3:1 to about 0.5 :1.

6. The process of claim 1, wherein ratio of said catalyst to said liquid epoxy resin is in the range of from about $5 \times 10^{-5}:1$ to about $2 \times 10^{-3}: 1$ (eq/eq).

7. The process of claim 1, wherein the first molecular weight is in the range of from about 340 to 800 and said second molecular weight is in the range of from about 600 to about 10000.

8. The process of claim 1, wherein said liquid epoxy resin consists essentially of diglycidyl ether of Bisphenol A; said compound having at least one active hydrogen is selected from the group consisting of bisphenol A, tetrabromobisphenol A, bisphenol E, bisphenol F and mixtures thereof; and said catalyst consists essentially of ethyl triphenyl phosphonium iodide.

9. The process of claim 1, wherein said one or more vertical reaction chambers comprises a vertical reaction chamber having three sequential reaction zones; a first reaction zone, a second reaction zone and a third reaction zone, wherein the first reaction zone is a bottom reaction zone where reactants (i), (ii), and (iii) enter, wherein the reaction zones have a temperature relationship as follows:

$$\text{Temperature}_{zone1} < \text{Temperature}_{zone2} < \text{Temperature}_{zone3}.$$

10. The process of claim 9, wherein the first reaction zone has a temperature ranging from 93° C. to 171° C., the second reaction zone has a temperature ranging from 105° C. to 205° C., and the third reaction zone has a temperature ranging from 127° C. to 216° C.

11. The process of claim 9, wherein the first reaction zone has a temperature ranging from 105° C. to 149° C., the second reaction zone has a temperature ranging from 127° C. to 182° C., and the third reaction zone has a temperature ranging from 160° C. to 205° C.

12. The process of claim 1, wherein said one or more vertical reaction chambers comprises a vertical reaction chamber having more than one successive reaction zone, wherein there exists a progressively higher temperature between each successive reaction zone.

13. A continuous process for upstaging epoxy resins, the process comprising: passing continuously and co-currently (i) a liquid epoxy resin having a first molecular weight, (ii)

a catalyst, and (iii) a polyhydric phenolic compound upflow through one or more vertical reaction chambers under conditions effective to produce a stream comprising an upstaged epoxy resin product having a second molecular weight higher than said first molecular weight, wherein equivalency ratio of said liquid epoxy resin to said polyhydric phenolic compound is from about 3.3:1 to about 0.5:1, and said one or more vertical reaction chambers comprises a vertical reaction chamber having more than one successive reaction zone, wherein there exists a progressively higher temperature between each successive reaction zone.

14. The process of claim 13, wherein said one or more vertical reaction chambers comprises a vertical reaction chamber having three sequential reaction zones; a first reaction zone, a second reaction zone and a third reaction zone, wherein the first reaction zone is a bottom reaction zone where reactants (i), (ii), and (iii) enter, wherein the reaction zones have a temperature relationship as follows:

$$Temperature_{zone1} < Temperature_{zone2} < Temperature_{zone3}.$$

15. The process of claim 14, wherein the first reaction zone has a temperature ranging from 93° C. to 171° C., the second reaction zone has a temperature ranging from 105° C. to 205° C., and the third reaction zone has a temperature ranging from 127° C. to 216° C.

16. The process of claim 15, wherein the first reaction zone has a temperature ranging from 105° C. to 149° C., the second reaction zone has a temperature ranging from 127° C. to 182° C., and the third reaction zone has a temperature ranging from 160° C. to 205° C.

17. A system for upstaging epoxy resins comprising
a first source supplying a liquid epoxy resin having a first molecular weight;
a second source supplying a catalyst; and
a third source supplying, co-currently with said liquid epoxy resin and said catalyst, a compound having at least one active hydrogen or reactive functional group capable of reacting with said liquid epoxy resin in the presence of said catalyst; and
at least one vertical reactor, operating in an upflow mode, in which a reaction mixture comprising said liquid epoxy resin, said catalyst and said compound reacts under conditions effective to produce a stream comprising an upstaged epoxy resin product having a second molecular weight, wherein said second molecular weight is higher than said first molecular weight, and said at least one vertical reactor comprises a vertical reaction chamber having more than one successive reaction zone, wherein there exists a progressively higher temperature between each successive reaction zone.

18. The system of claim 17, wherein said system further comprises a mixing unit to premix said liquid epoxy resin with said compound prior to addition of said catalyst to form said reaction mixture.

19. The system of claim 17, wherein said system further comprises a fourth source supplying co-currently a solvent and wherein said reaction mixture further comprises said solvent.

20. The system of claim 19, wherein the remaining solvent present in the stream comprising an upstaged epoxy resin is removed by post-reaction evaporations or distillations.

21. The system of claim 17, wherein said system further comprises a blending unit to blend said upstaged epoxy resin product with a material to form a formulated product, wherein said material comprises a diluent.

22. The system of claim 21, wherein said diluent comprises xylene, acetone, or mixtures thereof.

23. The system of claim 17, wherein said vertical reactor comprises a vertical reaction chamber having three sequential reaction zones; a first reaction zone, a second reaction zone and a third reaction zone, wherein the first reaction zone is a bottom reaction zone where reactants (i), (ii), and (iii) enter, wherein the reaction zones have a temperature relationship as follows:

$$Temperature_{zone1} < Temperature_{zone2} < Temperature_{zone3}.$$

24. The system of claim 23, wherein the first reaction zone has a temperature ranging from 93° C. to 171° C., the second reaction zone has a temperature ranging from 105° C. to 205° C., and the third reaction zone has a temperature ranging from 127° C. to 216° C.

25. The system of claim 24, wherein the first reaction zone has a temperature ranging from 105° C. to 149° C., the second reaction zone has a temperature ranging from 127° C. to 182° C., and the third reaction zone has a temperature ranging from 160° C. to 205° C.

* * * * *